United States Patent Office 2,851,123
Patented Sept. 9, 1958

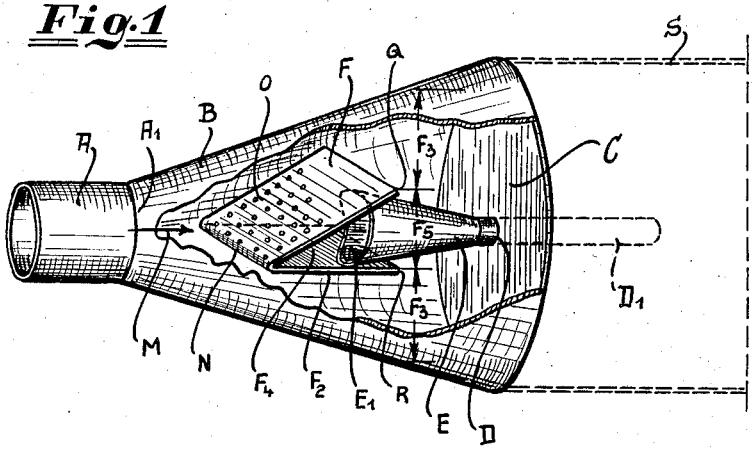
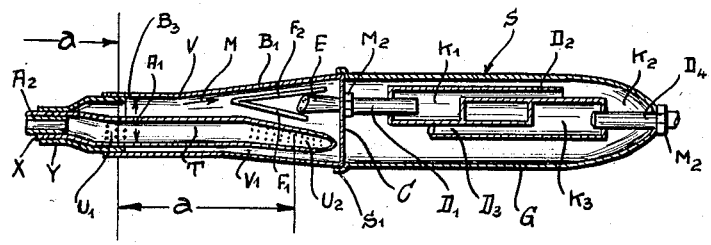
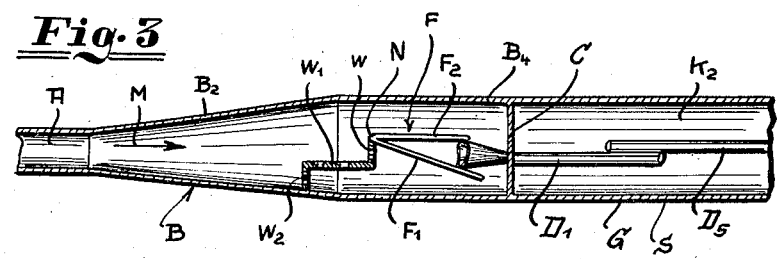

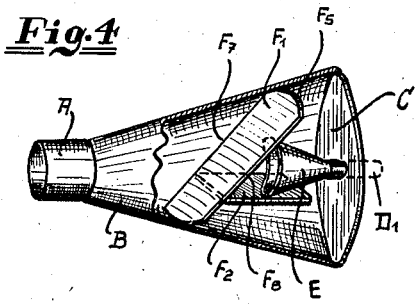
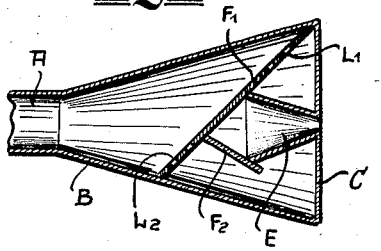
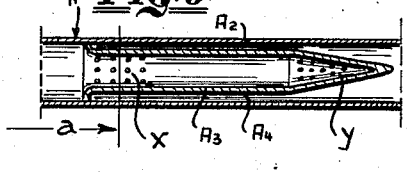
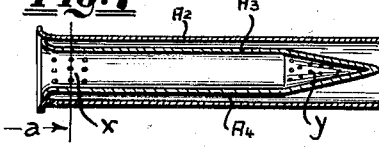
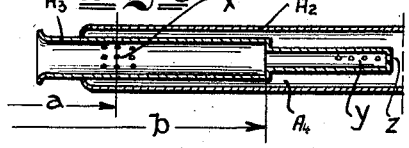
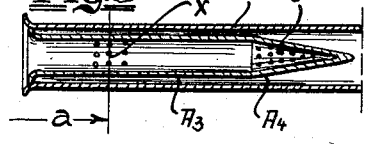
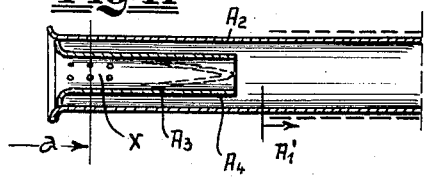
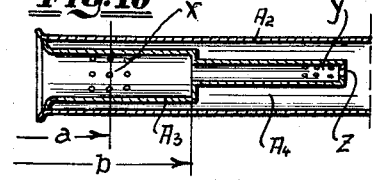
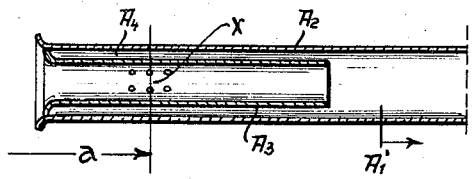

2,851,123

EXHAUST INSTALLATION FOR INTERNAL COMBUSTION ENGINES

Hans Karl Leistritz, Frankfurt am Main, Germany

Application June 13, 1955, Serial No. 515,141

Claims priority, application Germany June 19, 1954

18 Claims. (Cl. 181—70)

This invention relates to exhaust installation for internal combustion engines. The installation is primarily intended for silencing the noise of the exhaust but desirably also has a favourable influence on the engine performance. The main object of the invention is to provide an exhaust installation which occupies but a small space, so as to be more particularly suitable for fitting onto small vehicles of which the noise of the exhaust is loud, mainly motor cycles and relatively small motor vehicles, the installation being suitable for all types of four-stroke engines and two-stroke engines.

The invention is based on a known exhaust installation in which at least two silencer units are connected in series, each unit being arranged in a separate chamber. The first silencer unit in this arrangement is located after the exhaust pipe connected to the exhaust of the engine or after a part of such exhaust pipe.

For the first of the series-connected silencer units of the exhaust installation, a double deflection, each through 180°, of the pulsating gas flow, is achieved. The flow of gas coming from the exhaust pipe enters a casing pipe which is widely divergent and which surrounds the first silencer unit, and at the end of the said casing pipe, it strikes a baffle wall from which a tubular pipe element projects into the casing pipe, such pipe element opening at one of its ends into an outlet in the baffle wall and extending into the second silencer unit. The gas stream reflected from the baffle wall for the first time i. e. the gas stream directed rearwardly with a change in direction of 180°, is thus returned into the casing pipe and here impinges on a deflecting member which is arranged between the inlet opening from the exhaust pipe and the tubular pipe section in the casing pipe. This deflecting member causes a further reflection of the gas stream into the original direction of flow, this further reflection causing the gas stream to enter the pipe element.

According to the invention there is provided an exhaust silencer installation for internal combustion engines, comprising a first elongated silencer chamber, an inlet at one end of said chamber, outer walls laterally bounding said chamber and diverging away from said inlet at least over a part of their length, a baffle closing the other end of said chamber, a second silencer chamber having an end applied against said baffle so as to be in continuation of said first chamber, a pipe element of smaller cross-sectional area than that of said inlet and located in an outlet opening of said baffle, said pipe element extending into said first chamber, two surface deflection plates joined along a common side in inclined relation to form a hollow, open sided, wedge shaped deflector located in said first chamber with the wedge apex directed towards but spaced from said inlet and the wedge base directed towards but spaced from said baffle, and a divergent mouth constituting a part of said pipe element extending into said first chamber and terminating between said first and second deflection plates.

In the known construction hereinbefore referred to, the deflector is not of the shape just defined, but has a conical surface with the apex facing the flow and having a cone angle of approximately 90°. In the known arrangement, the pipe element is cylindrical, i. e. it is not made with a diverging mouth, and has a cross-section equal to the inlet cross-section of the first chamber. Moreover, it does not project into the deflector. The new design of the deflector and of the pipe element in accordance with the invention, and the particular arrangement thereof in the first chamber, serve more especially the following purposes: the hollow wedge which is formed by the two deflection plates and which is open at the sides, breaks the flow of gas and subdivides it into flow components which may have different flow velocities and a different quantity of flowing gas per unit of time, these flow components expanding against the baffle wall. A zone of relatively high negative pressure is formed within the cavity between the deflection plates. The gas streams directed back by the baffle wall are sucked into this zone of relative negative pressure from the side and from the baffle wall and are repeatedly reflected under favourable flow conditions by the deflection plates and finally introduced into the mouth of the pipe element. In this way, the streams of gas previously expanded up to the baffle wall are compressed again, while they are passing into the space between the deflection plates, and this compression is continued due to the tapering of the pipe element. Experiments have shown that as a result of the combination in accordance with the invention, an extremely favourable flattening of the wave form of the pulsating gas flows, i. e. a levelling of the gas pressure of the stream of gas issuing from the silencer unit with reduction in its pressure peaks, is obtained to a surprisingly high degree.

Embodiments of the invention are illustrated by way of example, in the accompanying drawings wherein:

Figure 1 is a perspective view showing diagrammatically one form of the first silencer unit of an exhaust installation, Figure 2 is a diagrammatic longitudinal section through a complete exhaust installation with a silencer unit similar to that of Figure 1, the exhaust pipe leading to the engine being shown broken away, Figure 3 is a diagrammatic longitudinal section of a modified constructional form of the exhaust installation with parts broken away at the ends, Figure 4 is a diagrammatic perspective view of a modified form of the first silencer unit, Figure 5 is a diagrammatic longitudinal section of another modified constructional form of the first silencer unit, Figures 6 to 12 are diagrammatic longitudinal sections of different embodiments of the exhaust pipe associated with the exhaust installation and not shown in the previous figures, the said pipe being combined with a narrower pipe perforated in the manner of a sieve.

The first silencer unit according to Figure 1 comprises a chamber consisting of a casing pipe B connected to the exhaust pipe A which is shown broken away and which leads to the exhaust outlet of the engine. The casing pipe B forms a funnel which diverges uniformly in cross-section and which is provided at the outlet end with a baffle wall C. Instead of using a funnel-shaped pipe with a constant cone angle, it is also possible to employ a cylinder which has a sudden increase in diameter towards the baffle wall C.

The baffle wall C completely closes the funnel-shaped pipe B except for a central aperture D from which a pipe $D_1$ leads to the next silencer unit. Fitted into the aperture D is a tubular guide element, for example, a smaller funnel E which is flared in a direction opposite to the funnel B. The funnel aperture $E_1$ opens into a wedge-shaped cavity which is formed between two deflection plates having guide surfaces $F_1$ and $F_2$, which converge to form an edge N facing the inflow direction of the pulsating flow of exhaust gas indicated by an arrow M. The cavity $F_4$ between the guide surfaces $F_1$ and $F_2$ is open at both sides, i. e., the guide surfaces terminate everywhere at a distance from the interior wall of the casing pipe B. The guide surfaces $F_1$ and $F_2$ are connected rigidly to the funnel E and together form a deflecting member F. The deflecting member and the funnel E are therefore both supported by the baffle wall C.

In relation to the baffle wall C, the surfaces $F_1$ and $F_2$ have at their outer edges Q, R a cross-section $F_5$ which is smaller than the total of the flow cross-section $F_3$ remaining between the edges Q and R and the casing pipe B. The free edges Q and R of the guide surfaces $F_1$ and $F_2$, respectively, are located at a considerable distance from the baffle wall C. The inlet cross-section $F_1$ of the funnel E contacts the guide surfaces $F_1$ and $F_2$ at a distance from the edges Q and R. $E_1$ is substantially as large as the inlet cross-section $A_1$ of the exhaust pipe A, or is somewhat smaller than $A_1$.

As indicated at O, the guide surface $F_1$ may be provided with a number of fine apertures.

The casing of the subsequent silencer unit into which the pipe $D_1$ opens is indicated by broken lines at S.

The pulsating flow M of exhaust gas from the exhaust pipe A is split up into two flow components at the edge N. The lower flow component travels along the guide surface $F_2$ substantially parallel to the original direction of flow indicated by the arrow M. The upper flow component is to a certain degree reflected at the guide surface $F_1$ which extends at an angle to the original direction of flow, and produces a pressure wave which returns towards the engine and which encounters the edge N again with the next exhaust pulses. Another small part of the upper flow component travels through the perforations O, if these are provided, and passes directly into the inlet opening $E_1$ of the funnel E.

The main part of the upper flow component travels over the guide surface $F_1$. The two flow components passing over the guide surfaces $F_1$ and $F_2$ flow to the baffle wall C, and thereby expand. When measured at right-angles to the axis of the casing pipe B, the cross-section of the baffle wall C is more than four times the cross-section of the inlet opening $E_1$ of the funnel E. The flows of gas are reflected by the baffle wall in a direction opposite to that indicated by the arrow M into the cavity $F_4$, these flows entering the triangular side openings of the cavity $F_4$ from both sides. Flowing is assisted by the considerable relative negative pressure which is produced between the surfaces $F_1$ and $F_2$ by the diffusor action of the gas flows moving over the surface $F_1$ and $F_2$. A further reflection is produced in the cavity $F_4$ on the inside of the guide surfaces $F_1$, $F_2$, and as a result of this reflection, the flow of gas again continues in the direction indicated by the arrow M, so that gas is introduced into the funnel opening $E_1$. This introduction is assisted by the pressure drop which exists between the interior of the casing pipe B and the interior of the following silencer unit. In the said following silencer unit, the pipe $D_1$ opens into an empty chamber which is practically at atmospheric pressure.

The cross-section of the pipe $D_1$ and of the opening D is arranged to be only a fraction of the inlet cross-section of the casing pipe B. By this means, there is produced a reduction of the pressure drop between the two silencer units, that is to say, a relative dynamic pressure, due to the great tapering of the funnel E towards the outlet opening D. This build up of dynamic pressure is desirable, particularly for two-stroke engines with reverse scavenging, with which the degree of charging is improved by the setting up of this dynamic pressure and by its reaction on the engine.

Figure 2 shows a silencer unit which corresponds to Figure 1 and which has silencer units S connected on the output side thereof. Instead of having a conical casing pipe B as shown in Figure 1, the casing pipe now consists of a cylindrical section $B_3$ which is followed by a funnel-shaped section $B_1$. In this case, $F_2$ is the upper guide surface which extends substantially parallel to the direction of flow and $F_1$ is the lower guide surface which is at an inclination to the flow direction M of the pulsating exhaust stream. This exhaust stream in this constructional form does not pass from the exhaust pipe directly into the space of the first silencer unit, but first of all into what may be termed an inlet sprinkler T. This consists of a pipe which is closed at the end and which is of smaller cross-section than the inlet exhaust pipe and is provided with two groups of sieve-like perforations $U_1$, $U_2$. The gas flow component issuing from the perforations $U_1$ enters the space V between the pipe T and the casing pipe. The remainder of the flow of exhaust gas leaves the pipe T through the perforations $U_2$ and travels below the guide surface $F_1$ into the intermediate spaces V and $V_1$. The group of perforations $U_1$ is disposed at a mean distance $a$ from the exhaust of the engine (not shown). The centre of the group of perforations $U_2$ is again at a distance $a$ from the group of perforations $U_1$. As hereinafter to be explained, the distance $a$ must be 175 mm. (plus or minus 10 mm.) or an integral multiple of this length.

The silencer units S following the first unit each consist of an acoustic chamber $K_1$, $K_2$, $K_3$, i. e. empty chambers. The pipe $D_1$ extending from the first silencer unit opens into the chamber $K_1$. A pipe $D_2$ of substantially smaller cross-section than the chamber $K_1$ leads from the latter into the chamber space $K_2$, and a pipe $D_3$ of substantially smaller cross-section than the chamber $K_2$ extends from the latter into the chamber $K_3$. Connected to the chamber $K_3$ is a pipe $D_4$ of substantially smaller cross-section which opens into the atmosphere. The wall of the chamber $K_2$ is the outside wall of the three silencer units $K_1$, $K_2$, $K_3$ and is connected rigidly to the first silencer unit by a flange $S_1$. The pipes $D_1$ and $D_4$ hold the chamber walls $K_1$ and $K_3$ and hold the associated pipes $D_2$ and $D_3$ in position inside the chamber $K_2$. The pipe $D_4$ is fitted tightly into the external wall G of the chamber $K_2$ by means of a screw coupling $M_2$, and the pipe $D_1$ also has a sealing screw coupling $M_1$ at the wall C. Instead of using the series-connection of three acoustic chambers $K_1$, $K_2$ and $K_3$, it is also possible to provide several such chambers or other silencer units or even only two chambers or silencer units or only one such chamber or silencer unit, according to which sound frequencies are still to be filtered out at different rates after the first silencer unit B.

The constructional form according to Figure 3, differs as regards the first silencer unit B from that according to Figure 2 mainly by the fact that the exhaust pipe A comprises initially a conically flared section $B_2$ and then a cylindrical section $B_4$ which merges with the same diameter into the wall G of the following silencer unit S. In this case, the deflecting member F is disposed in the cylindrical section $B_4$ of the casing B and an inlet sprinkler is not provided in the preceding section $B_2$. In a manner similar to Figure 1, the guide surfaces or deflectors $F_1$ and $F_2$ converge to form an edge N. Extending from this edge N is a supplementary baffle plate W which is at right-angles to the direction of flow M and terminates before the casing wall B. A perforated plate $W_1$ extending in the direction of flow is connected to the end point of the plate W, the said plate $W_1$ being continued as a perforated plate $W_2$ which is at right-angles to the direction of flow and which ends at the casing wall B. The plates W, $W_1$, $W_2$ are of substantially the same width as the guide surfaces $F_1$, $F_2$. They cause a preliminary reflection of part of the entering stream of gas, and this has the effect of improving efficiency with some types of engine constructions. The component gas stream passing through the perforations of the plates $W_1$, $W_2$ passes along beneath the guide surface $F_1$ to the baffle wall C. In this case, the guide surface $F_1$ is not formed with perforations.

In the embodiment according to Figure 3, the outlet pipe $D_1$ again opens into an empty acoustic chamber $K_2$, which is shown broken away. A pipe $D_5$ of substantially smaller cross-section may lead from the chamber $K_2$ either into the atmosphere, or into a following silencer unit of known construction, or of a construction similar to Figure 2.

Figure 4 shows a modification of the deflecting member F of the first silencer unit corresponding to Figure 1. The inclined guide surface or deflector $F_1$ is in this case extended at both ends as far as the wall of the casing B and fits with rounded edges $F_5$ and $F_6$ on the casing B. In this case, the stream of gas travels past the edges $F_7$ and $F_8$ of the guide surface $F_1$ and is partially reflected from this surface. Apertures are not in this case formed in the guide surface or deflector $F_1$.

Figure 5 shows a modification of the construction of the first silencer unit B as compared with Figure 4, in which the guide surface $F_1$ merges at the top and bottom end into perforated extension pieces $L_1$ and $L_2$ which extend as far as the casing B.

In Figures 1 to 5, the exhaust pipe A is shown broken away. In all these cases, however, it may contain means for improving efficiency, and the inlet sprinkler T is then omitted in the case of Figure 2. This means for improving efficiency consists in that the exhaust pipe A according to Figures 6 to 12 comprises a solid-walled section $A_2$ and a perforated section $A_3$. The solid-walled section $A_2$ is then used in Figures 1 to 5 instead of the exhaust pipe indicated generally by A and joins on to the casing pipe B. In accordance with Figures 6 to 12, the pipe $A_3$ has a smaller cross-section than the external pipe $A_2$ and forms an intermediate space $A_4$ with the latter.

According to Figures 6 to 12, the pipe $A_3$ has at least a first group X of sieve-like perforations. The centre of the group of perforations is always disposed at a distance $a$ from the exhaust of the engine (not shown). In the examples shown in Figures 11 and 12, only a single group of apertures or perforations X is provided. In the examples shown in Figures 6 to 10, the internal pipe $A_3$ is formed with a second group of perforations Y. The centre of this group of perforations is at a distance from the exhaust of the engine which is an integral multiple of the distance $a$, that is to say, $2a$ or $3a$. In both cases, the distance $a$ is 17.5 cm. (plus or minus 1 cm.), i. e. it should as far as possible not deviate from 17.5 cm. by more than 1 cm. in either direction.

In the case of Figures 9 and 10, the pipe $A_3$ has a constriction in its cross-section which must be at a distance $b$ from the exhaust of the engine. This distance $b$ is an integral multiple of the distance $a$ and is $2a$ in the case of Figures 9 and 10. It has been shown that this arrangement of the groups of perforations at specified distances from the exhaust of the engine and the provision of a constriction in the pipe $A_3$ at the distance $b$ from the engine produces the best increase in efficiency, because these distances conform to the wave-lengths of the pulsating streams of gas.

In the construction according to Figures 6 to 8, the perforated pipe $A_3$ is closed at the end facing the first silencer unit and the group Y of perforations is located at this end. The closing of the pipe prevents the return flow of pressure waves reflected in the silencer, this being undesirable with many types of engine construction. In the examples shown in Figures 9 and 10, the pipe $A_3$ has a small opening Z at the end facing the silencer unit, while in Figures 11 and 12, the pipe $A_3$ is open at the end facing the first silencer unit. In this case, pressure waves reflected by the silencer may flow back to the engine, which is desirable for improving efficiency with many constructions and/or for certain speeds. However, even when only one perforation group X is provided according to Figures 11 and 12, the pipe $A_3$ may be closed at the end, as indicated by broken lines in Figure 11.

In Figures 11 and 12, the reference $A_1'$ indicates that position nearest the engine exhaust up to which it is possible for the following silencer unit to be pushed on to the external pipe $A_2$. As is known, the most favorable position of the silencer on the exhaust pipe is adjusted by displacement in the direction of the arrow to different distances from the engine exhaust, according to the engine construction and characteristic. The displaceable point $A_1'$ may therefore correspond, for example, to the inlet cross-section $A_1$ of Figure 1.

In other respects, Figures 6 to 12 only differ as regards the position of the inner pipe $A_3$ relatively to the outer pipe $A_2$ at the end which is to be connected to the engine exhaust by means of an intermediate member, which is not shown, and which usually forms an exhaust duct cast onto the engine cylinder. The different constructions correspond to the various possible assemblies with different types of engines, because usually the exhaust pipe cannot be arranged directly following the engine exhaust proper (i. e. the exhaust valve or exhaust port), because of cooling fins or the like. Whereas only the internal pipe $A_3$ is connected to the exhaust of the engine cylinder with the arrangement according to Figure 9, both pipes $A_2$ and $A_3$ are jointly connected to the exhaust duct of the engine cylinder in all cases shown in Figures 7 to 12. Only the external pipe $A_2$ is connected in Figure 6. In all the examples shown in Figures 6 to 12, those ends of the pipes $A_2$ and $A_3$ which face the engine exhaust are interconnected. The pulsating stream of gas coming from the engine exhaust thus passes through the group of apertures or perforations X and Y into the space $A_4$ of the external pipe $A_2$. It is a surprising fact that this deflection and interruption of the flow of gas results in an improved efficiency due to the reaction of the exhaust installation on the engine and simultaneously in an improved silencing effect, since some sound frequencies are already broken and rendered innocuous in the exhaust pipe according to Figures 6 to 12.

I claim:

1. An exhaust silencer installation for internal combustion engines, comprising a first elongated silencer chamber, an inlet at one end of said chamber, outer walls laterally bounding said chamber and diverging away from said inlet at least over a part of their length, a baffle closing the other end of said chamber, a second silencer chamber having an end applied against said baffle so as to be in continuation of said first chamber, a pipe element of smaller cross-sectional area than that of said inlet and located in an outlet opening of said baffle, said pipe element extending into said first chamber, two surface deflection plates joined along a common side in inclined relation to form a hollow, open sided, wedge shaped deflector located in said first chamber with the wedge apex directed towards but spaced from said inlet and the wedge base directed towards but spaced from said baffle, and a divergent mouth constituting a part of said pipe element extending into said first chamber and terminating between said deflection plates.

2. Exhaust installation according to claim 1, wherein said deflection plates are inclined to the longitudinal axis of the first chamber at angles not greater than 45°.

3. Exhaust installation according to claim 1, wherein one of said deflection plates extends substantially parallel to the longitudinal axis of said elongated first chamber.

4. Exhaust installation according to claim 3, wherein the other of said plates is formed with fine perforations.

5. Exhaust installation according to claim 3, wherein the other of said plates has extensions which contact the walls of said first chamber near the inlet end and the baffle end thereof.

6. Exhaust installation according to claim 5, wherein said extensions are perforated.

7. Exhaust installation according to claim 1, wherein said divergent mouth terminates between said deflection plates by entering between them and contacting them at locations spaced from the free ends thereof.

8. Exhaust installation according to claim 1, wherein said deflection plates are flat and the hollow enclosed between them opens to a cross-section which is smaller than the minimum flow cross-section between the deflector formed by said plates and the surrounding walls of the first chamber.

9. Exhaust installation according to claim 1, wherein the area of said baffle is a multiple of the inlet area of said divergent mouth.

10. Exhaust installation according to claim 1, wherein said first chamber is conical in shape, said deflector being arranged in the middle portion of said first chamber.

11. Exhaust installation according to claim 1, in which said first chamber comprises at least one conically flared portion and at least one cylindrical portion.

12. Exhaust installation according to claim 11, wherein said cylindrical portion follows the conical portion and the deflector is arranged in the cylindrical portion.

13. A silencer for internal combustion engines, comprising, in combination, a first silencer stage, a second silencer stage, a baffle wall arranged between said first and second silencer stages, an enlarging section forming the outer wall of said first silencer stage, said section being connected at the larger end thereof with said baffle wall, a guide unit arranged in said outer wall of said first silencer stage and including a plurality of deflection plates converging toward the inlet of said first silencer stage, said deflection plates having edges separated by a gap from said baffle wall, and a funnel arranged in said first silencer stage and having the larger end thereof arranged between said edges of said deflection plates, said funnel having an aperture arranged between said first and second stages approximately in said baffle wall.

14. A silencer as claimed in claim 13, and an entering stage to said first silencer stage, the cross section of said larger end of said funnel being smaller than the cross section of said entering stage.

15. A silencer as claimed in claim 13, and an entering stage to said first silencer stage, said entering stage opening into said enlarging section forming the outer wall of said first silencer stage, the inlet cross section of said larger end of said funnel being approximately equal to the cross section of said entering stage.

16. A silencer as claimed in claim 13, said funnel having an extension projecting from said aperture into said second silencer stage.

17. A silencer as claimed in claim 16, said second silencer stage having a device for reverting the direction of flow of the gases through said second silencer stage.

18. A silencer as claimed in claim 17, said second silencer stage having an exit pipe having a cross section being substantially less than the cross section of said reverting device.

References Cited in the file of this patent

UNITED STATES PATENTS

| | | |
|---|---|---|
| 992,839 | Wolle et al. | May 23, 1911 |
| 1,484,526 | O'Connor | Feb. 19, 1924 |
| 1,866,004 | Beamer | July 5, 1932 |
| 2,016,859 | Hanson | Oct. 8, 1935 |
| 2,122,086 | Chase | June 28, 1938 |
| 2,323,955 | Wilson | July 13, 1943 |
| 2,473,103 | Lathers | June 14, 1949 |

FOREIGN PATENTS

| | | |
|---|---|---|
| 625,942 | France | May 2, 1927 |